United States Patent
Watanabe

(10) Patent No.: US 10,403,920 B2
(45) Date of Patent: Sep. 3, 2019

(54) FUEL BATTERY CELL

(71) Applicant: TOYOTA JIDOSHA KABUSHIKI KAISHA, Toyota-shi, Aichi (JP)

(72) Inventor: Yusuke Watanabe, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 673 days.

(21) Appl. No.: 14/927,191

(22) Filed: Oct. 29, 2015

(65) Prior Publication Data

US 2016/0126571 A1    May 5, 2016

(30) Foreign Application Priority Data

Nov. 5, 2014  (JP) .................................. 2014-225164

(51) Int. Cl.
  *H01M 8/24* (2016.01)
  *H01M 8/242* (2016.01)
  (Continued)

(52) U.S. Cl.
  CPC ....... *H01M 8/242* (2013.01); *H01M 8/04156* (2013.01); *H01M 8/2457* (2016.02); *H01M 8/2483* (2016.02); *H01M 8/0271* (2013.01); *H01M 8/0284* (2013.01); *H01M 2008/1095* (2013.01)

(58) Field of Classification Search
  CPC ... H01M 8/242; H01M 8/2457; H01M 8/2483
  See application file for complete search history.

(56) References Cited

U.S. PATENT DOCUMENTS

| | | |
|---|---|---|
| 2010/0086830 A1 | 4/2010 | Shimoi et al. |
| 2011/0076581 A1 | 3/2011 | Lai et al. |
| | (Continued) | |

FOREIGN PATENT DOCUMENTS

| | | |
|---|---|---|
| DE | 112004002185 | 9/2006 |
| DE | 102010046148 A1 | 4/2011 |
| | (Continued) | |

*Primary Examiner* — Ula C Ruddock
*Assistant Examiner* — Frank A Chernow
(74) *Attorney, Agent, or Firm* — Finnegan, Henderson, Farabow, Garrett & Dunner, LLP

(57) ABSTRACT

Provided is a fuel battery cell capable of suppressing absorption of water discharged from a manifold by a porous body disposed between a membrane electrode assembly and a separator, and so improving drainage performance. This fuel battery cell 1 includes: a porous passage 20c that is disposed to be opposed to a membrane electrode assembly 10m on a cathode side, and a separator 30 sandwiching the membrane electrode assembly 10m and the porous passage 20c, the separator including a cathode off-gas discharging through hole 32b through which cathode off-gas discharged from the porous passage 20c flows. The porous passage 20c has a sticking-out part 201 when viewed in the thickness direction of the separator 30, and the sticking-out part sticks out into the cathode off-gas discharging through hole 32b from a side of the membrane electrode assembly 10m, and a length of the sticking-out part 201 in a longer direction of the separator 30 is shorter than one side of the cathode off-gas discharging through hole 32b on the membrane electrode assembly 10m side.

3 Claims, 3 Drawing Sheets

(51) Int. Cl.
*H01M 8/04119* (2016.01)
*H01M 8/2483* (2016.01)
*H01M 8/2457* (2016.01)
H01M 8/0271 (2016.01)
H01M 8/0284 (2016.01)
H01M 8/1018 (2016.01)

(56) References Cited

U.S. PATENT DOCUMENTS

2013/0260274 A1* 10/2013 Carnevale ........... H01M 8/0267
429/457
2013/0260281 A1   10/2013 Sato

FOREIGN PATENT DOCUMENTS

| | | |
|---|---|---|
| JP | 2012-123949 | 6/2012 |
| JP | 5240282 | 7/2013 |
| JP | 2013-187030 | 9/2013 |
| WO | WO 2012/076956 | 6/2012 |

* cited by examiner

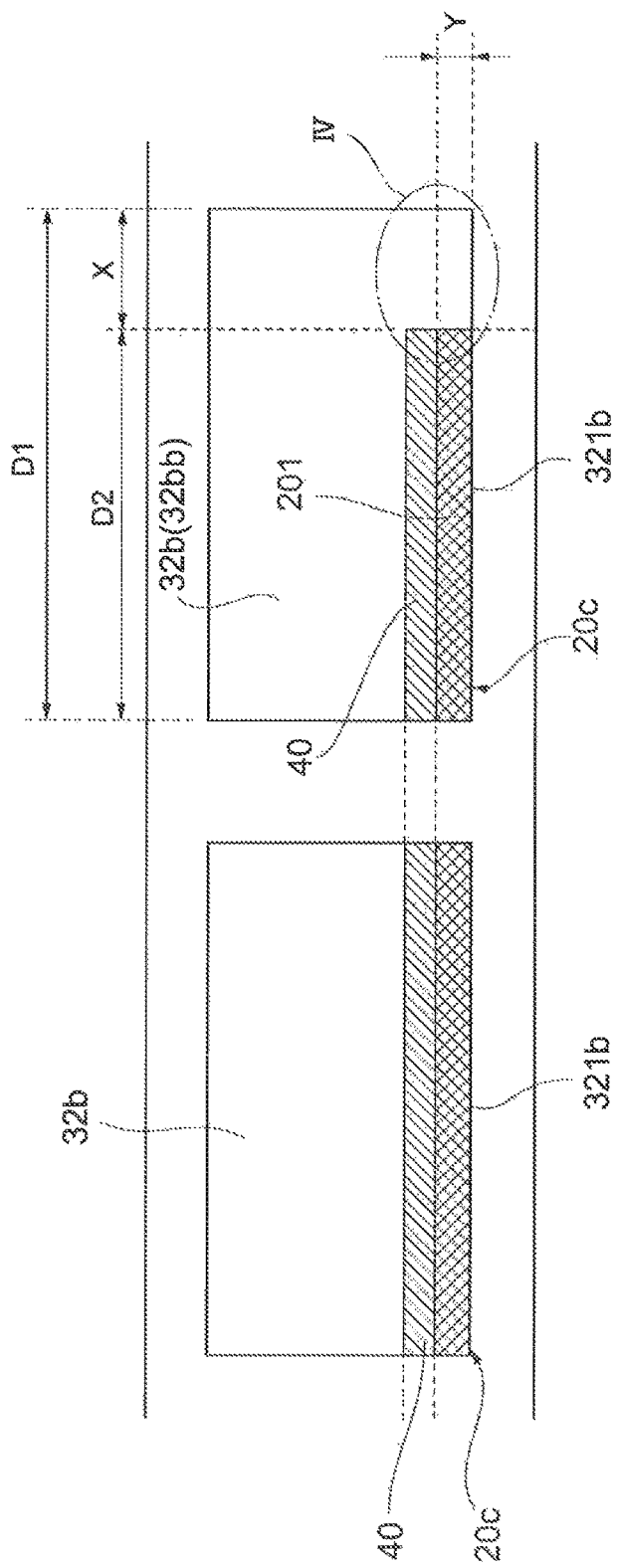

FUEL BATTERY CELL

BACKGROUND OF THE INVENTION

Field of the Invention

The present invention relates to fuel battery cells.

Background Art

A polymer electrolyte fuel cell includes a membrane electrode assembly that is the lamination of a catalyst layer and a gas diffusion layer in this order on either face of an electrolyte membrane having ion permeability. This membrane electrode assembly is sandwiched between gas passage layers and between separators to be a fuel battery cell, and a plurality of such fuel battery cells are combined to configure a fuel cell stack. At an anode (negative electrode), fuel gas containing hydrogen is supplied, and protons are generated from the fuel gas through an electrochemical reaction expressed in the following formula (1). The thus generated protons pass through the electrolyte membrane to move to a cathode (positive electrode). At a cathode (positive electrode) on the other side, oxidant gas containing oxygen is supplied, which reacts with protons coming from the anode (negative electrode) to undergo an electrochemical reaction expressed in the following formula (2) to generate water (hereinafter this may be called generated water). Through the electrochemical reactions occurred at the electrolyte membrane-side surfaces of the pair of electrode structures, electric energy is taken from the electrodes.

Anode reaction: $H_2 \rightarrow 2H^+ + 2e^-$ (1), and

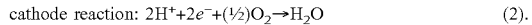

cathode reaction: $2H^+ + 2e^- + (\frac{1}{2})O_2 \rightarrow H_2O$ (2).

In some of such fuel battery cells, a porous body is disposed as a passage forming member between the membrane electrode assembly and the separator so as to define a gas passage through which reactant gas for power generation is allowed to flow along the surface of the gas diffusion layer.

Various techniques have been then proposed for such fuel battery cells. For instance, a fuel battery cell described in the following Patent Document 1 includes a porous body that is disposed so as to stick out into a manifold (through hole) formed in the fuel battery cell.

CITATION LIST

Patent Document(s)

[Patent Document 1] JP2013-187030 A

SUMMARY OF THE INVENTION

Through the electrochemical reaction as stated above, water is generated at the cathode, and this water is discharged through the manifold formed in the fuel battery cell. In the fuel battery cell described in Patent Document 1 as described above, since the porous body is disposed so as to stick out into the manifold, water discharged through the manifold may be absorbed by the porous body again. If water is absorbed by the porous body sticking out in the manifold, drainage performance and accordingly power generation performance may be degraded.

In view of such a problem, the present invention aims to provide a fuel battery cell capable of suppressing absorption of water discharged from a manifold by a porous body disposed between a membrane electrode assembly and a separator, and so improving drainage performance.

To fulfill the above-stated object, a fuel battery cell according to the present invention includes: a membrane electrode assembly that is lamination of an anode and a cathode on both faces of an electrolyte membrane; a porous passage that is disposed to be opposed to the membrane electrode assembly on a cathode side, the porous passage defining a gas passage through which oxidant gas is allowed to flow to the cathode; and a pair of separators sandwiching the membrane electrode assembly and the porous passage. The separators include a cathode off-gas discharging through hole that penetrates through the separators in a thickness direction and is disposed on an outside of the membrane electrode assembly, through which cathode off-gas discharged from the porous passage flows, and the porous passage has a sticking-out part when viewed in the thickness direction, the sticking-out part sticking out into the cathode off-gas discharging through hole from a side of the membrane electrode assembly of the cathode off-gas discharging through hole, and a length of the sticking-out part in a longer direction of the separator is shorter than one side of the cathode off-gas discharging through hole on the membrane electrode assembly side.

In the fuel battery cell according to the present invention, the porous passage has a sticking-out part when viewed in the thickness direction of the separator, the sticking-out part sticking out into the cathode off-gas discharging through hole from a side of the membrane electrode assembly of the cathode off-gas discharging through hole, and a length of the sticking-out part in a longer direction of the separator is shorter than one side of the cathode off-gas discharging through hole on the membrane electrode assembly side. In this way, since there is a part where the porous passage does not stick out in the cathode off-gas discharging through hole, water discharged from the porous passage easily flows through such a not sticking-out part, which can suppress absorption of the discharged water by the porous passage again. As a result, drainage performance of the fuel battery cell can be improved.

Preferably in the fuel battery cell according to the present invention, the separators have a plurality of the cathode off-gas discharging through holes arranged in parallel along a long side of the separator, and among the plurality of cathode off-gas discharging through holes, in the cathode off-gas discharging through holes disposed on sides of both ends of the separator in the longer direction, the sticking-out part has a length in the longer direction that is shorter than the length of one side of the cathode off-gas discharging through hole on the side of the membrane electrode assembly.

Preferably in the fuel battery cell according to the present invention, the length of the sticking-out part in the longer direction is shorter than the length of one side of the cathode off-gas discharging through hole on the side of the membrane electrode assembly by 1 mm or more.

Preferably in the fuel battery cell according to the present invention, the sticking-out part sticks out by 1 mm or more from one side of the cathode off-gas discharging through hole on the side of the membrane electrode assembly toward the outside of the membrane electrode assembly.

The present invention can provide a fuel battery cell capable of suppressing absorption of water discharged from a manifold by a porous body disposed between a membrane electrode assembly and a separator, and so improving drainage performance.

BRIEF DESCRIPTION OF THE DRAWINGS

FIG. 2 is an enlarged view of a circle W in FIG. 1.

DESCRIPTION OF THE PREFERRED EMBODIMENTS

Embodiments of the present invention will now be described referring to the attached drawings. Although the present invention will be described by way of the following preferred embodiments, changes can be made by a lot of methods without departing from the scope of the present invention, and embodiments other than the present embodiments can be used. Therefore, all changes within the scope of the present invention are included in claims.

Figure 1:
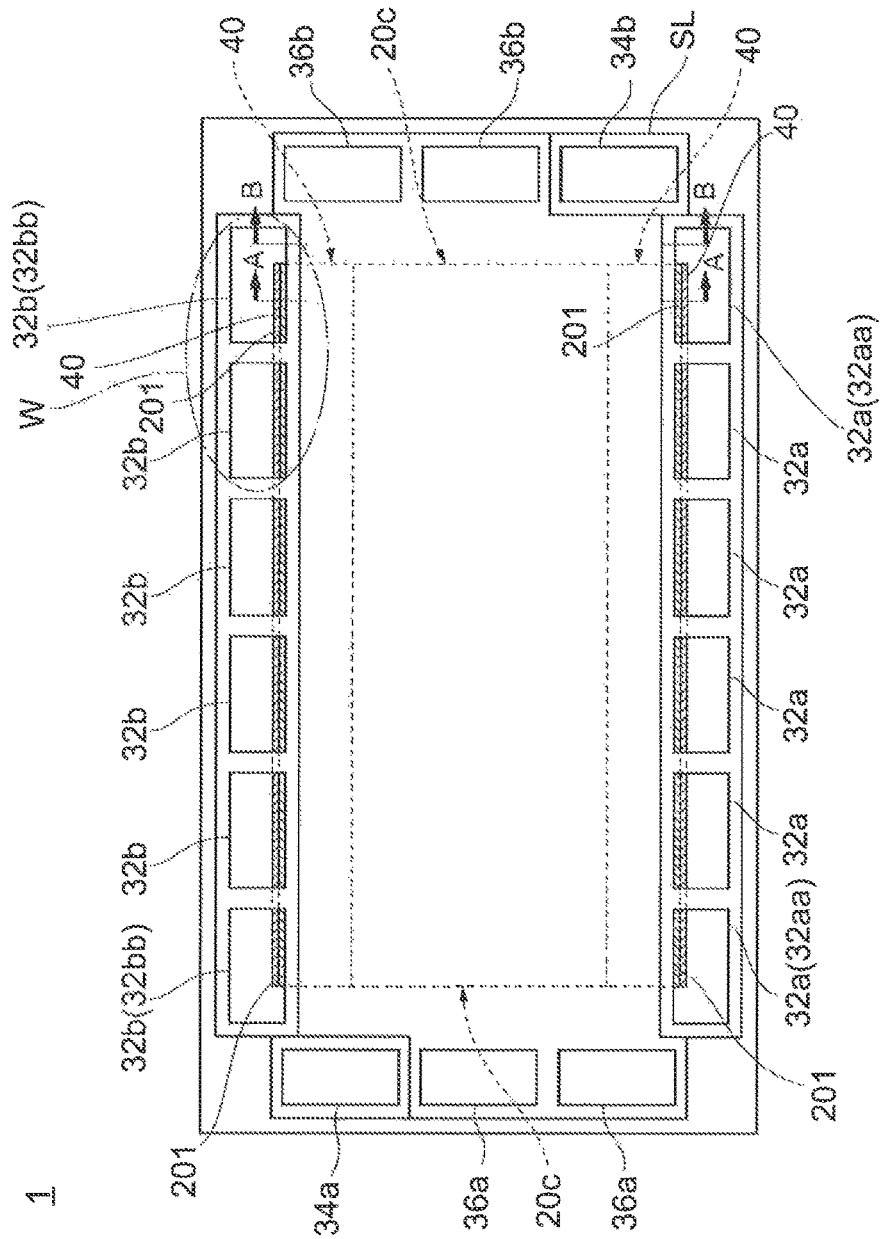
FIG. 1 is a plan view illustrating the schematic configuration of a fuel battery cell in one embodiment of the present invention.
Figure 3A:
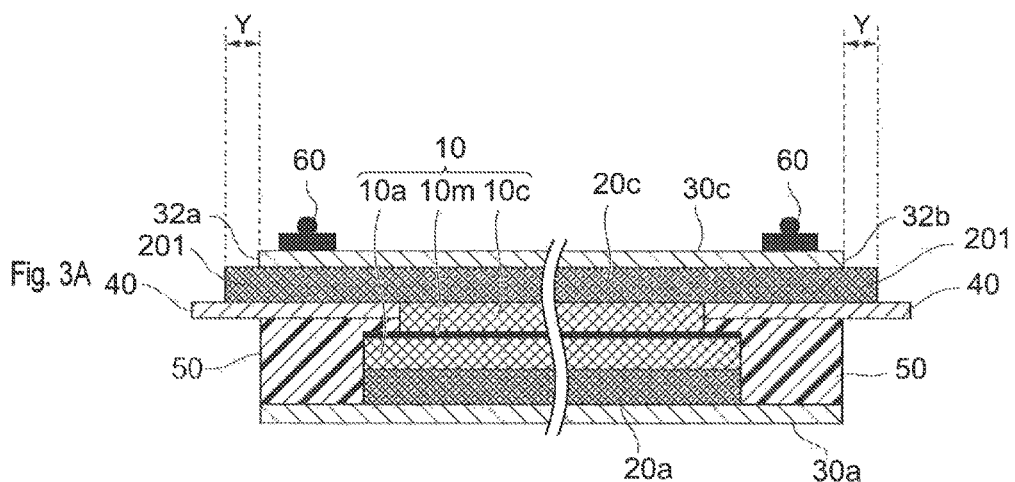
FIG. 3A and FIG. 3B are a cross-sectional view illustrating the schematic configuration of a fuel battery cell in one embodiment of the present invention.
Figure 3B:
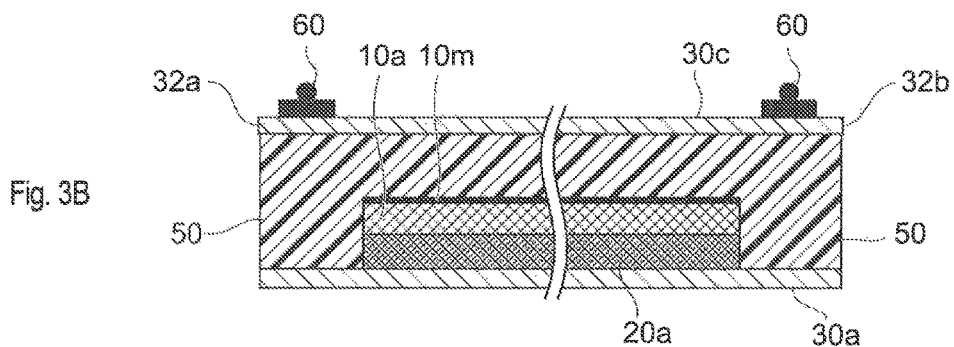

Firstly referring to FIGS. 1 through 3, a fuel battery cell 1 according to the present embodiment is described below. FIG. 1 is a plan view illustrating the schematic configuration of the fuel battery cell 1. FIG. 2 is an enlarged view of a circle W in FIG. 1. FIG. 3A is a cross-sectional view taken along the arrow A-A of FIG. 1, and FIG. 3B is a cross-sectional view taken along the arrow B-B of FIG. 1.

Note here that a plurality of the fuel battery cells 1 each illustrated in FIGS. 1 through 3 as a basic unit is stacked so as to configure a fuel cell stack (not illustrated). The fuel battery cell 1 as a lamination is electrically connected in series, and fuel gas, such as hydrogen, is supplied to a fuel electrode (anode) side, and oxidant gas, such as oxygen or air, is supplied to an oxygen electrode (cathode) side. Through electrochemical reactions of them, power is generated.

As illustrated in FIGS. 1 through 3, the fuel battery cell 1 includes a membrane electrode gas diffusion layer assembly 10, porous passages 20a and 20c, separators 30a and 30c, a sealing plate 40 and a sealing member 50. Hereinafter the separators 30a and 30c may be collectively called a separator 30.

The membrane electrode gas diffusion layer assembly 10 includes gas diffusion layers 10a and 10c bonded to both faces of a membrane electrode assembly 10m. The membrane electrode assembly 10m includes electrodes (anode and cathode) bonded to both faces of an electrolyte membrane. In the present embodiment, the electrolyte membrane used is Nafion (registered trademark). Another polymer membrane having proton conductivity may be used as the electrolyte membrane. In the present embodiment, the gas diffusion layers 10a and 10c used are carbon cloth. Another member having electrical conductivity and gas permeability, such as carbon paper, may be used as the gas diffusion layers 10a and 10c. In the present embodiment, the gas diffusion layer 10a on the anode side is larger than the gas diffusion layer 10c on the cathode side in the membrane electrode gas diffusion layer assembly 10, and the sizes of the gas diffusion layers 10a and 10c may be selected appropriately. As illustrated in FIGS. 3A and 3B, the membrane electrode gas diffusion layer assembly 10 is disposed at a center part of the fuel battery cell 1.

The porous passage 20a is stacked on the surface of the gas diffusion layer 10a on the anode side in the membrane electrode gas diffusion layer assembly 10. The porous passage 20a includes a porous body, and defines a gas passage through which hydrogen as fuel gas is allowed to flow along the surface of the gas diffusion layer 10a on the anode side. The porous passage 20c is stacked on the surface of the gas diffusion layer 10c on the cathode &de in the membrane electrode gas diffusion layer assembly 10. Similarly to the porous passage 20a, the porous passage 20c includes a porous body, and defines a gas passage through which air as oxidant gas is allowed to flow along the surface of the gas diffusion layer 10c on the cathode side. In the present embodiment, the porous passages 20a and 20c used are porous bodies such as expand metal, which may be another porous body having electrical conductivity.

The separator 30a is stacked on the surface of the porous passage 20a. The separator 30c is stacked on the surface of the porous passage 20c. In the present embodiment, the separator 30 used is a metal plate. Another member that does not transmit gas but has electrical conductivity may be used as the separator 30. In the present embodiment, the direction along a short side of the separator 30 (vertical direction in FIGS. 1 and 2) is referred to as a "shorter direction of the separator 30", and the direction along a long side of the separator 30 (horizontal direction in FIGS. 1 and 2) is called a "longer direction of the separator 30". The stacking direction of the fuel battery cell 1 (vertical direction in FIGS. 3A and 3B) is called a "thickness direction of the separator 30".

As illustrated in FIG. 1, the separator 30 has a rectangular outer shape. Then the separator 30 includes a plurality of through holes bored therein so as to penetrate through the separator 30 in the thickness direction. That is, the separator 30 has a plurality of air-introducing through holes 32a arranged in parallel along one long side (the illustrated lower side) to introduce air supplied from the outside of the fuel battery cell 1 to the porous passage 20c.

The separator 30 further has a plurality of cathode off-gas discharging through holes 32b arranged in parallel along the other long side (the illustrated upper side) to discharge cathode off-gas discharged from the porous passage 20c to the outside of the fuel battery cell 1.

The separator 30 further has a hydrogen-introducing through hole 34a to introduce hydrogen supplied from the outside of the fuel battery cell 1 to the porous passage 20a, and a plurality of cooling-water introducing through holes 36a to introduce cooling water supplied from the outside of the fuel battery cell 1 to a cooling-water passage that are along one short side (the illustrated left side).

The separator 30 further has an anode off-gas discharging through hole 34b to discharge anode off-gas discharged from the porous passage 20a to the outside of the fuel battery cell 1, and a plurality of cooling-water discharging through holes 36b to discharge cooling water discharged from the cooling-water passage to the outside of the fuel battery cell 1 that are along the other short side (the illustrated right side). In the present embodiment, these through holes have a rectangular shape. Then, a rubber gasket 60 is disposed around each through hole on the surface of the separator 30 (separator 30c) (see FIGS. 3A and 3B), whereby a seal line SL is formed as illustrated in FIG. 1.

The sealing member 50 is formed between the separator 30a and the separator 30c and at the outer periphery of the membrane electrode gas diffusion layer assembly 10, and is formed around each through hole between the separator 30a and the separator 30c. This sealing member 50 is prepared by curing liquid sealing material (e.g., liquid rubber) having fluidity. As the liquid sealing material having fluidity, thermosetting sealing material having fluidity always before heat curing or thermoplastic semi-cured state sealing material whose viscosity decreases during heating to assume fluidity may be used, for example. To this end, the sealing plate 40 is disposed between the sealing member 50 and the porous passage 20c, which is to prevent the flowing-in of the liquid sealing material to the porous passage 20c during disposing the sealing member 50. In the present embodiment, the sealing plate 40 used is a titanium plate, for example, and other materials may be used.

In the present embodiment, the porous passage 20a disposed on the anode side with reference to the membrane electrode assembly 10m has a substantially same size as the size of the gas diffusion layer 10a on the anode side. Then, the porous passage 20c disposed on the cathode side with reference to the membrane electrode assembly 10m has a length of the long side that is shorter than the length of the long side of the membrane electrode assembly 10m, and the porous passage 20c has a length of the short side that is longer than an interval between the air-introducing through holes 32a and the cathode off-gas discharging through holes 32b of the separator 30.

Referring to FIG. 2, the sizes of the porous passage 20c and the sealing plate 40 are described more. FIG. 2 is an enlarged view of the circle W in FIG. 1, which is to explain the porous passage 20c and the sealing plate 40 sticking out into the cathode off-gas discharging through hole 32b.

As illustrated in FIG. 2, the porous passage 20c has a sticking-out part 201 that sticks out into the cathode off-gas discharging through hole 32b from the side of the membrane electrode assembly 10m when viewed in the thickness direction of the separator 30 (thickness direction of the fuel battery cell 1), and the length of the sticking-out part 201 in the longer direction of the separator 30 (D2 in FIG. 2) is shorter than the length of a side 321b (D1 in FIG. 2) of the cathode off-gas discharging through hole 32b on the side of the membrane electrode assembly 10m. Herein as illustrated in FIG. 1, among the plurality of cathode off-gas discharging through holes 32b arranged in parallel along the long side of the separator, in the cathode off-gas discharging through holes 32bb disposed on the sides of both ends of the separator in the longer direction, the sticking-out parts 201 as stated above are formed that are shorter than the length of one side 321b of the cathode off-gas discharging through hole 32bb on the membrane electrode assembly 10m side. That is, in a planar view, a plurality of the sticking-out parts 201 are formed in the present embodiment.

The size of the sticking-out part 201 is further described. As illustrated in FIG. 2, the length of the sticking-out part 201 in the longer direction of the separator 30, i.e., D2 is preferably shorter than D1 by 1 mm or more. In the present embodiment, the sticking-out part 201 preferably protrudes from one side 321b of the cathode off-gas discharging through hole 32b on the side of the membrane electrode assembly 10m in the direction away from the membrane electrode assembly 10m (outer direction of the membrane electrode assembly 10m (upper in FIG. 2)) by 1 mm or more. In other words, in a planar view of the fuel battery cell 1, there is a dent at a part where the sticking-out part does not protrude in the cathode off-gas discharging through hole 32b (circle IV in FIG. 2), and the dent preferably has dimensions such that the length in the longer direction of the separator 30 is 1 mm or more (X in FIG. 2 is 1 mm or more) and the length in the shorter direction of the separator 30 is 1 mm or more (Y in FIG. 2 is 1 mm or more).

As illustrated in FIG. 1, the porous passage 20c sticks out in the air-introducing through holes 32a as well in a similar manner. Specifically, the porous passage 20c has a sticking-out part 201 that sticks out into the air-introducing through hole 32a from the side of the membrane electrode assembly 10m when viewed in the thickness direction of the separator 30, and the length of the sticking-out part 201 in the longer direction of the separator 30 is shorter than the length of one side of the air-introducing through hole 32a on the side of the membrane electrode assembly 10m. Then as illustrated in FIG. 1, among the plurality of air-introducing through holes 32a arranged in parallel along the long side of the separator, in the air-introducing through holes 32aa disposed on the sides of both ends of the separator in the longer direction, the sticking-out parts 201 as stated above are formed that are shorter than the length of one side 321b of the air-introducing through holes 32aa on the side of the membrane electrode assembly 10m.

The length of the sticking-out part 201 in the longer direction of the separator 30 that sticks out in the air-introducing through holes 32aa is preferably shorter than the length of one side of the air-introducing through hole 32a on the side of the membrane electrode assembly 10m by 1 mm or more. The sticking-out part 201 protruding in the air-introducing through hole 32aa preferably protrudes from one side of the air-introducing through hole 32a on the side of the membrane electrode assembly 10m in the direction away from the membrane electrode assembly 10m (outer direction of the membrane electrode assembly 10m (lower in FIG. 1)) by 1 mm or more.

As illustrated in FIG. 2, the sealing plate 40 also sticks out into the cathode off-gas discharging through hole 32b from the side of the membrane electrode assembly 10m when viewed in the thickness direction of the separator 30, and the length of the sticking-out part in the longer direction of the separator 30 (D2 in FIG. 2) is shorter than the length of one side 321b (D1 in FIG. 2) of the cathode off-gas discharging through hole 32b on the side of the membrane electrode assembly 10m. In the present embodiment, the sticking-out part of the sealing plate 40 sticks out more than the porous passage 20c into the cathode off-gas discharging through hole 32b when viewed in the thickness direction of the separator 30.

As illustrated in FIG. 1, the sealing plate 40 sticks out in the air-introducing through holes 32a as well in a similar manner. That is, the sealing plate 40 sticks out into the air-introducing through hole 32a from the side of the membrane electrode assembly 10m when viewed in the thickness direction of the separator 30, and the length of the sticking-out part in the longer direction of the separator 30 is shorter than the length of one side of the air-introducing through holes 32a on the side of the membrane electrode assembly 10m. Then, the sticking-out part of the sealing plate 40 sticks out more than the porous passage 20c into the air-introducing through hole 32a when viewed in the thickness direction of the separator 30.

As stated above, the porous passage 20c of the present embodiment has a sticking-out part 201 that sticks out into the cathode off-gas discharging through hole 32b from the side of the membrane electrode assembly 10m of the cathode off-gas discharging through hole 32b when viewed in the thickness direction of the separator 30, and the length of the sticking-out part 201 in the longer direction of the separator 30 is shorter than the length of one side 321b of the cathode off-gas discharging through hole 32b on the side of the membrane electrode assembly 10m. In this way, since there is a part where the porous passage 200 does not stick out in the cathode off-gas discharging through hole 32b, water discharged from the porous passage 20c easily flows through such a not sticking-out part, which can suppress absorption of the discharged water by the porous passage 20c again. As a result, drainage performance of the fuel battery cell 1 can be improved.

In the present embodiment, among the plurality of cathode off-gas discharging through holes 32b arranged in parallel along the long side of the separator 30 when viewed in the thickness direction of the separator 30, in the cathode off-gas discharging through holes 32b disposed on the sides of both ends of the separator 30 in the longer direction, the sticking-out part 201 sticks out at the end part of the porous passage 20c, and the length of the sticking-out part 201 in the longer direction of the separator 30 is shorter than the length of one side of the cathode off-gas discharging through hole 32b on the side of the membrane electrode assembly 10m. This means that there is a plurality of parts of the porous passage 20c that does not stick out into the cathode off-gas discharging through holes 32b, and water discharged from the porous passage 20c easily flows through such not sticking-out parts, which can further suppress absorption of the discharged water by the porous passage 20c again. As a result, drainage performance of the fuel battery cell 1 can be improved more.

That is a description of embodiments of the present invention by way of specific examples. The present invention, however, is not limited to these specific examples. That is, design modifications to these specific examples, which will be made by a person skilled in the art as appropriate, are also included in the scope of the present invention as long as they have the features of the present invention. For instance, each element in the above specific examples and the arrangement, materials, conditions, shapes, dimensions, etc., thereof are not limited to those described above and may be modified as appropriate.

1 fuel battery cell
10 membrane electrode gas diffusion layer
10m membrane electrode assembly
20a, 20c porous passage
30a, 30c separator
32a air-introducing through hole
32b cathode off-gas discharging through hole
34a hydrogen-introducing through hole
34b anode off-gas discharging through hole
36a cooling-water introducing through hole
36b cooling-water discharging through hole
40 sealing plate
50 sealing member
60 gasket
201 sticking-out part

What is claimed is:

1. A fuel battery cell, comprising:
a membrane electrode assembly that is lamination of an anode and a cathode on both faces of an electrolyte membrane;
a porous passage that is disposed to be opposed to the membrane electrode assembly on a cathode side, the porous passage defining a gas passage through which oxidant gas is allowed to flow to the cathode; and
a pair of separators sandwiching the membrane electrode assembly and the porous passage, wherein
the separators include a plurality of cathode off-gas discharging through holes arranged in parallel along one long side of the separators, wherein the plurality of cathode off-gas discharging through holes penetrate through the separators in a thickness direction and are disposed on an outside of the membrane electrode assembly, through which cathode off-gas discharged from the porous passage flows,
a long side of the porous passage has a sticking-out part when viewed in the thickness direction, the sticking-out part sticking out into each of the cathode off-gas discharging through holes from a membrane electrode assembly side of the cathode off-gas discharging through holes, wherein a length of the sticking-out part in a direction parallel to one side of the cathode off-gas discharging through holes on the membrane electrode assembly side is shorter than a length of the one side of the cathode off-gas discharging through holes on the membrane electrode assembly side,
a short side of the porous passage sticks out into end holes of the plurality of cathode off-gas discharging through holes at both ends of the plurality of cathode off-gas discharging through holes, and
in each of the end holes of the cathode off-gas discharging through holes at both ends of the plurality of cathode off-gas discharging through holes, a length of the sticking-out part in the direction parallel to the one side of the cathode off-gas discharging through holes on the membrane electrode assembly side is shorter than a length of a respective end hole on the membrane electrode assembly side.

2. The fuel battery cell according to claim 1, wherein in each of the end holes of the cathode off-gas discharging through holes at both ends of the plurality of cathode off-gas discharging through holes, a length of the sticking-out part in the direction parallel to the one side of the cathode off-gas discharging through holes on the membrane electrode assembly side is shorter than a length of the respective end hole on the membrane electrode assembly side by 1 mm or more.

3. The fuel battery cell according to claim 1, wherein the sticking-out part sticks out by 1 mm or more from the one side of the cathode off-gas discharging through holes on the membrane electrode assembly side toward the outside of the membrane electrode assembly.

* * * * *